United States Patent
Moysi et al.

(10) Patent No.: US 10,389,528 B2
(45) Date of Patent: Aug. 20, 2019

(54) ON-DEMAND GENERATION AND DISTRIBUTION OF CRYPTOGRAPHIC CERTIFICATES

(71) Applicant: Microsoft Technology Licensing, LLC., Redmond, WA (US)

(72) Inventors: Liran Moysi, Ramat Gan (IL); Aviram Cohen, Tel Aviv (IL); Noam Liran, Hertzliya (IL)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 162 days.

(21) Appl. No.: 15/448,079

(22) Filed: Mar. 2, 2017

(65) Prior Publication Data

US 2018/0254896 A1 Sep. 6, 2018

(51) Int. Cl.
*H04L 29/06* (2006.01)
*H04L 9/08* (2006.01)
*H04L 9/32* (2006.01)

(52) U.S. Cl.
CPC .......... *H04L 9/0861* (2013.01); *H04L 9/3247* (2013.01); *H04L 9/3263* (2013.01); *H04L 63/0823* (2013.01); *H04L 63/0281* (2013.01)

(58) Field of Classification Search
CPC ... H04L 9/0861; H04L 9/3247; H04L 9/3263; H04L 63/0281; H04L 63/10; H04L 63/166; H04L 63/823
See application file for complete search history.

(56) References Cited

U.S. PATENT DOCUMENTS

| | | | |
|---|---|---|---|
| 8,327,128 B1* | 12/2012 | Prince | H04L 63/0823 713/150 |
| 9,197,673 B1* | 11/2015 | Gaddy | H04L 63/0823 |
| 2003/0093666 A1* | 5/2003 | Millen | G06F 21/335 713/157 |
| 2004/0181469 A1* | 9/2004 | Saeki | H04L 29/06 705/30 |
| 2006/0143442 A1 | 6/2006 | Smith | |
| 2008/0263215 A1* | 10/2008 | Schnellbaecher | H04L 63/0281 709/229 |
| 2010/0071052 A1 | 3/2010 | Mao et al. | |
| 2011/0072260 A1* | 3/2011 | Koo | H04N 21/26613 713/156 |

(Continued)

OTHER PUBLICATIONS

Jha, Rashmi, "Manage certificates via Azure Key Vault", Sep. 26, 2016, 6 pages.

(Continued)

*Primary Examiner* — Ghodrat Jamshidi
(74) *Attorney, Agent, or Firm* — M&B IP Analysts, LLC

(57) ABSTRACT

A method and proxy device for on-demand generation of cryptographic certificates. The method includes receiving, by a proxy device, a request to access a cloud application; identifying a domain name designated in the received request; determining if the identified domain name is signed by a valid cryptographic certificate saved locally in the proxy device; and sending, to a certificate generator system, a certification request to issue a new cryptographic certificate to sign the identified domain name, when the identified domain name is not a signed domain name.

17 Claims, 5 Drawing Sheets

(56) References Cited

U.S. PATENT DOCUMENTS

| | | | | |
|---|---|---|---|---|
| 2011/0320818 | A1* | 12/2011 | Krishna | G06F 21/34 713/175 |
| 2012/0210123 | A1* | 8/2012 | Castelnuovo | H04L 63/0823 713/156 |
| 2013/0097656 | A1* | 4/2013 | Kennedy | G06F 21/57 726/1 |
| 2014/0082204 | A1* | 3/2014 | Shankar | H04L 63/166 709/227 |
| 2016/0077824 | A1* | 3/2016 | Vishnepolsky | G06F 16/958 717/172 |
| 2016/0142375 | A1* | 5/2016 | Tubi | H04L 63/0281 726/1 |
| 2017/0317837 | A1* | 11/2017 | Alrawais | H04L 9/3268 |
| 2018/0191709 | A1* | 7/2018 | Thayer | H04L 63/0823 |

OTHER PUBLICATIONS

Donahue, Patrick R., "Introducing Dedicated SSL Certificates", https://blog.cloudflare.com/dedicated-ssl-certificates/, Published on: Sep. 30, 2016, 11 pages.

"Do On-Demand SSL Certificates Exist?-", http://security.stackexchang.com/questions/43851/do-on-demand-ssl-certificates-exist?rq=1, Retrieved on: Jan. 24, 2017, 2 pages.

Kanagaratnam, Elyse, "Renaming Your Subdomain: The Side Effects", https://support.zendesk.com/hc/en-us/articles/203660756-Renaming-your-subdomain-the-side-effects, Published on: Oct. 26, 2012, 4 pages.

"It It Possible to Use Wildcard Certificate to Sign Subdomain Certificate?", http://stackoverflow.com/questions/37319232/it-it-possible-to-use-wildcard-certificate-to-sign-subdomain-certificate, Retrieved on: Jan. 24, 2017, 1 page.

"Multiple Secure Subdomains with a Wildcard SSL Certificate", https://phaseshiftllc.com/articles/2008/10/27/multiple-secure-subdomains-with-a-wildcard-ssl-certificate.html, Published on: Oct. 27, 2008, 3 pages.

Smith, Nathan, "Maintaining SSL Certificates for a Multi-Tenant SaaS using Let's Encrypt", http://rrsoft.co/2016/07/11/using-lets-encrypt-for-a-multi-tenant-web-application/, Published on: Jul. 11, 2016, 5 pages.

"Domains and SSL OpenShift Developers", http://web.archive.org/web/20161117002541/https://developers.openshift.com/managing-your-applications/domains-ssl.html, Published on: Nov. 17, 2016, 11 pages.

* cited by examiner

ON-DEMAND GENERATION AND DISTRIBUTION OF CRYPTOGRAPHIC CERTIFICATES

BACKGROUND

Organizations and businesses that develop, provide, or otherwise maintain cloud-based applications have become accustomed to relying on these services and implementing various types of environments from complex websites to applications and services provided as a software-as-service (SaaS) delivery model. Such services and applications are collectively referred to as "cloud applications."

Cloud applications are typically accessed by users using a client device via a web browser. Cloud applications include, among others, e-commerce applications, social media applications, enterprise applications, gaming applications, media sharing applications, storage applications, software development applications, and so on. Many individual users, businesses, and enterprises turn to cloud applications in lieu of "traditional" software applications that are locally installed and managed. For example, an enterprise can use Office® 365 online services for email accounts, rather than having an Exchange® Server maintained by the enterprise.

The communication between a client device's browser and a server hosting a cloud application (or service) is typically established over a secured connection. A predominant communication protocol used to establish a secured connection is a secure sockets layer (SSL) protocol or a transport layer security (TLS) protocol. The SSL protocol utilizes cryptographic (SSL) certificates (or simply certificates) to establish the secured connection.

To establish a secured connection, the browser requests that the server identify itself. In response, the server sends a copy of its certificate including its public key. The browser then checks the certificate against a list of trusted certificate authorities (CAs). If the browser trusts the received certificate, the server creates, encrypts, and sends back a symmetric session key using the server's public key. The server decrypts the symmetric session key using its private key and sends back an acknowledgement encrypted with the session key to start the encrypted session over a secured connection. New certificates are created and signed only by certificate authorities (CAs).

In some cloud-computing deployments, the communication between client devices and cloud-applications is proxied by means of a proxy device. An example for such a deployment including a suffix proxy is illustrated in FIG. 1.

FIG. 1 shows an example network diagram 100 showing deployment including a suffix proxy. As seen in FIG. 1, a cloud computing platform 110 includes a server 117 executing one or more cloud applications 115. The cloud applications 115 are typically accessed by a user of a client device 130 via a web browser 131. The connection between the client device 130 and the server 113 is proxied by a suffix proxy 140. The suffix proxy 140 modifies any request to access one of the cloud applications 115, such that the request is directed to a different entity of the cloud computing platform.

To this end, the suffix proxy 140 typically inspects the network traffic to detect a request address (e.g., a URL) of one of the cloud applications 115. The suffix proxy 140 also modifies webpages, so that no network addresses are provided to the client device 130 that would direct the client device 130 to access the cloud application 115 directly. If such a network address is detected, the suffix proxy 140 rewrites that address, for example, by appending a pre-defined domain name to the original network address. The addition may refer or redirect the browser to a different proxy or server (not shown). For example, the URL (network address) https://www.oursite.com would be accessed through https://www.oursite.com.network-proxy-service.com.

To allow a secured communication between the browser 131 and a cloud application 115 addressed by the modified (suffixed) URL, the suffix proxy 140 serves a valid certificate that at least designates a domain name of the modified URL. Particularly, such a certificate must be signed by an authorized certificate authority (CA).

To this end, the suffix proxy 140 is typically pre-configured with a list of signed certificates, each of which designates (or signs) one or more signed domain names. A signed domain name is a domain name that is known to the proxy 140 a-priori (e.g., oursite.com.network-proxy-service.com). However, in most cases, the entity controlling the suffix proxy 140 is not the cloud service provider managing the cloud computing platform 110. Therefore, any configuration changes made in the platform 110 is not reported in the suffix proxy 140.

Specifically, the cloud service provider can add, remove, and/or modify applications, servers, and/or tenants from the cloud computing platform 110. For example, a cloud application previously addressed by https://www.oursite.com can support a new tenant (customer) at the address https://www.tenant1.oursite.com. The new address is suffixed as well by the proxy 140 (e.g., https://www.tenant1.oursite.com.network-proxy-service.com).

Such a change would require the suffix proxy 140 to maintain a certificate also signing the new suffixed address. If such a certificate is not maintained by the suffix proxy 140, then an error message (blocking access) is sent to the browser requesting to access an application addressed by the new suffixed address (https://www.tenant1.oursite.network-proxy-service.com).

One approach to overcome this limitation is by generating certificates on-demand by the suffix proxy 140. The generated certificate would sign the suffixed domain name as requested by the browser 131. To allow this, the proxy 140 must have its signing certificate installed on any client device 130 accessing the cloud platform 110. However, such a solution is not practical, and, regardless, is not a secured solution. For example, a proxy issuing its own certificates can be exploited to execute man-in-the-middle attacks.

It would therefore be advantageous to provide a solution that would overcome the deficiencies noted above.

SUMMARY

This Summary is provided to introduce a selection of concepts in a simplified form that are further described below in the Detailed Description. This Summary is not intended to identify key features or essential features of the claimed embodiments, nor is it intended to be used to limit the scope of the various claimed embodiments. Moreover, the sole purpose of this Summary is to present some concepts of one or more embodiments in a simplified form as a prelude to the more detailed description that is presented later. For convenience, the term "some embodiments" or "various embodiments" may be used herein to refer to a single embodiment or multiple embodiments of the disclosure.

Some embodiments disclosed herein include a method for on-demand generation of cryptographic certificates. The method comprises: receiving, by a proxy device, a request to access a cloud application; identifying a domain name designated in the received request; determining if the identified domain name is signed by a valid cryptographic certificate saved locally in the proxy device; and sending, to a certificate generator system, a certification request to issue a new cryptographic certificate to sign the identified domain name, when the identified domain name is not a signed domain name.

Some embodiments disclosed herein include a non-transitory computer readable medium having stored thereon instructions for causing a processing circuitry to execute a process for on-demand generation of cryptographic certificates, the process comprising: receiving, by a proxy device, a request to access a cloud application; identifying a domain name designated in the received request; determining if the identified domain name is signed by a valid cryptographic certificate saved locally in the proxy device; and sending, to a certificate generator system, a certification request to issue a new cryptographic certificate to sign the identified domain name, when the identified domain name is not a signed domain name.

Some embodiments disclosed herein include a proxy device for on-demand generation of cryptographic certificates. The proxy device comprises: a processing circuitry; and a memory, the memory containing instructions that, when executed by the processing circuitry, configure the proxy device to: receive, by a proxy device, a request to access a cloud application; identify a domain name designated in the received request; determine if the identified domain name is signed by a valid cryptographic certificate saved locally in the proxy device; and send, to a certificate generator system, a certification request to issue a new cryptographic certificate to sign the identified domain name, when the identified domain name is not a signed domain name.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
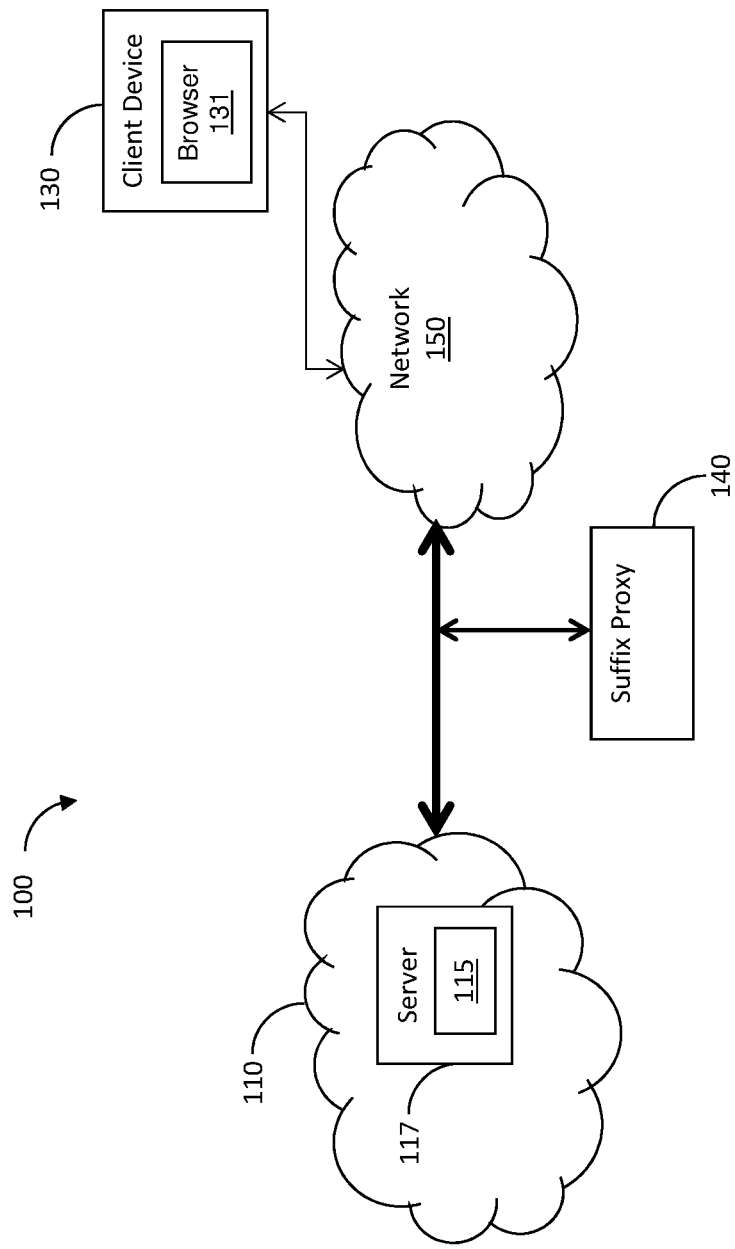
FIG. 1 is a diagram of a typical deployment of a suffix proxy serving a cloud computing platform.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example, a proxy device, such as a suffix proxy or a forward proxy, is configured to cause on-demand generation of cryptography certificates (hereinafter certificates). In an embodiment, a certificate is generated, on-demand, when the proxy device does not maintain a valid certificate signing a domain name of a cloud application requested to be accessed by a client device. In an embodiment, any certificate generated by a demand of one proxy device is propagated or provided to all proxy devices deployed in the network.

Figure 2:
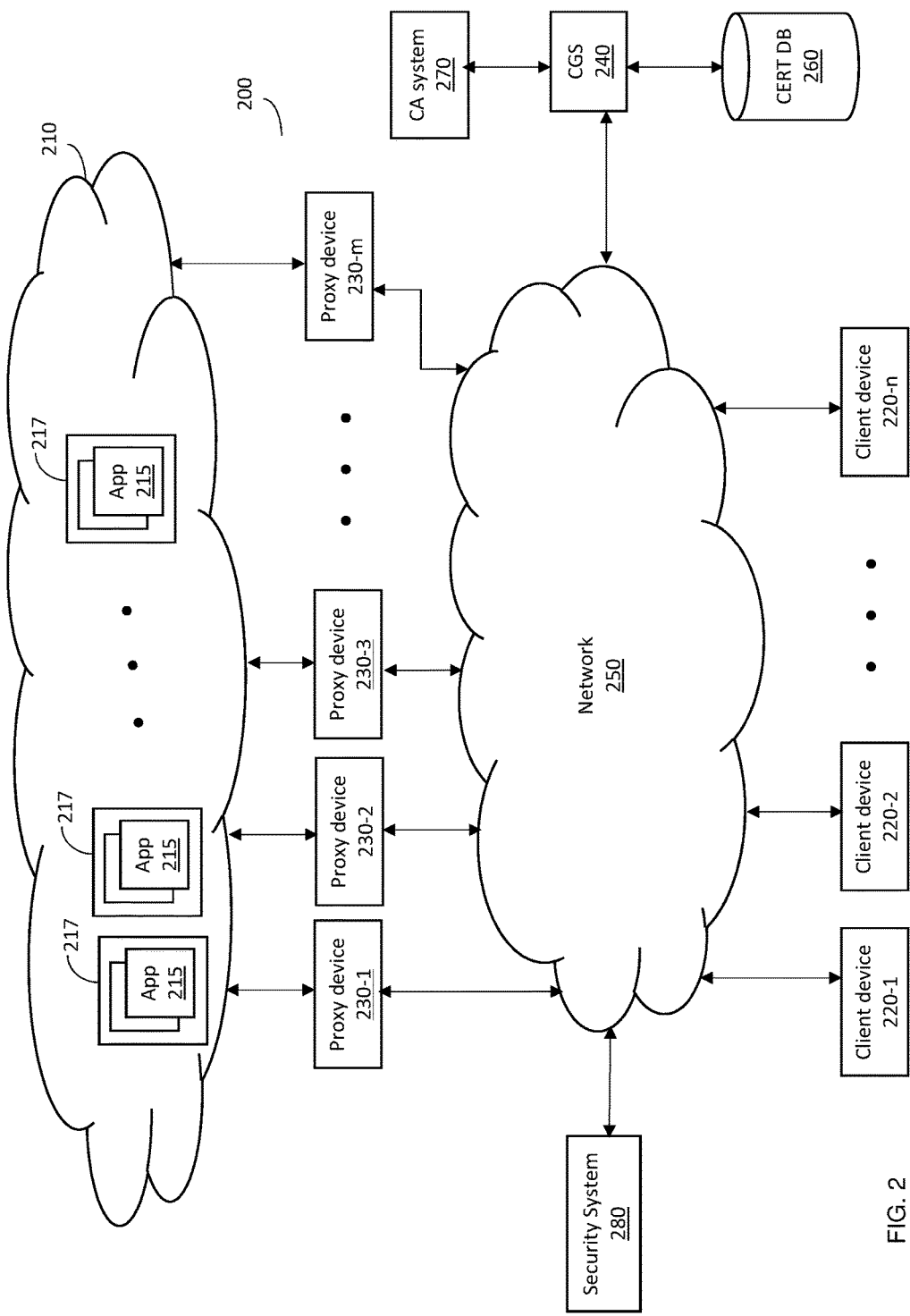
FIG. 2 is a network diagram utilized to describe the various disclosed embodiments.

FIG. 2 is an example diagram of a networked system 200 utilized to describe the various disclosed embodiments. The networked system 200 includes a cloud computing platform 210 which may be a private cloud, a public cloud, or a hybrid cloud providing computing resources to applications or services executed therein. In an embodiment, the cloud computing platform 210 may be a datacenter.

Organizations and businesses that develop, provide, or otherwise maintain cloud based applications have become accustomed to relying on "cloud" services and implementing various types of environments from complex websites to applications and services provided as SaaS delivery models. Such services and applications are collectively referred to as "cloud applications 215".

As illustrated in the example FIG. 2, an instance of a cloud application 215 is executed by a server 217 installed in the cloud computing platform 210. The cloud application 215 may include, but is not limited to, an e-commerce application, a collaboration application, an office and messaging application, a social media application, an enterprise application, a gaming application, a media sharing application, and the like. The server 217 may be an application server, a web server, and the like, and can be realized as a virtual machine or a physical machine.

The networked system 200 further includes a plurality of client devices 220-1 through 220-N (collectively referred to hereinafter as client devices 220 and individually as a client device 220, merely for simplicity purposes) and a plurality of proxy devices 230-1 through 230-M (collectively referred to hereinafter as proxy devices 230 and individually as a proxy device 230, merely for simplicity purposes) that are communicatively connected to a network 250. A certificate generator system (CGS) 240 is communicatively connected to the network 250. The CGS 240 is also connected to a certificate database (CERT DB) 260 and a certificate authority (CA) system 270. In certain example deployments, a security system 280 securing the cloud computing platform 210 and cloud applications 215 is connected to the network 250.

The network 250 may be, for example, a wide area network (WAN), a local area network (LAN), the Internet, and the like. Each client device 220 may include, for example, a personal computer, a laptop, a tablet computer, a smartphone, a wearable computing device, or any other computing device.

Each client device 220 is configured to access the one or more cloud applications 215 using, for example, a web browser (not shown). A web browser may include any software application (app) installed on a client device 220 that is configured to access web resources. In an embodiment, a secured connection is established between one of the client devices 220 and the server 217 using cryptographic protocols including, but not limited to, Transport Layer Security (TLS) and Secure Sockets Layer (SSL) protocols.

Communication over the secured connection can be performed using a layer-7 protocol such as, but not limited to, HTTPS, SMTPS, and the like. In general, secured connections can be utilized for any of the cloud applications mentioned above (e.g., web browsing, email, instant messaging, and voice-over-IP (VoIP), and the like).

A client device 220 may be a managed device or unmanaged device. A managed device is typically secured by IT personnel of an organization, while an unmanaged device is not.

Traffic between the client devices 220 and the cloud computing platform 210 is proxied by the proxy devices 230. Typically, the proxy devices 230 are deployed in different geographical locations. The traffic is directed from a client device 220 (e.g., the client device 220-1) through a proxy device (e.g., the proxy device 230-2) selected by, for example, a load balancer (not shown). In an embodiment, each of the proxy devices 230 may be either a suffix proxy device or a forward proxy device. The embodiments disclosed herein are equally applicable to these different types of proxy devices.

In an embodiment, each proxy device 230 can be configured to inspect the network traffic and to detect cloud-based application's 215 addresses. Examples for such addresses include, for example, uniform resource locators (URLs), uniform resource identifiers (URIs), and so on. As non-limiting examples, the proxy device 230 can decompile, deconstruct, or disassemble network traffic for inspection.

In one embodiment, a proxy device 230, operating as a suffix device, is configured to modify requested URLs (including webpages and JavaScript executed therein), so that no URL is provided to the client device 220 that would direct the client device 220 to directly access the cloud application 215. If such a network address is detected, a proxy device 230 is configured to rewrite that address, for example, by appending a predefined sub-domain name to the original network address. The added name may refer or redirect the browser to, for example, the security system 280. For example, the URL (network address) https://www.ouresite.com would be accessed through https://www.oursomesitenetwork-proxy-service.com.

In another embodiment, the proxy device 230, operating as a forward proxy device, is configured to receive requests from a group of client devices 220 and to use rewrite rules to redirect the requests.

That is, the proxy device 230 is configured to modify or otherwise rewrite the domain name (in a URL) requested by the client devices 220. The connection between the servers 217 and the client devices 220 is established over a secured connection. As mentioned above, the secured connection, e.g., a TLS or SSL connection, is established using the exchange of certificates between two entities. In the deployment illustrated in FIG. 2, the proxy devices 230 serve the certificates for domain names that the client devices' 220 requests are redirected to. As such, any modified (suffixed or rewritten) domain name should signed by a valid certificate served to a requesting client device 220.

As an example, the following table lists all domain names signed in a certificate CERT-1 and the name of the CA signed the certificate.

TABLE 1

| CERT-1 | |
|---|---|
| *.app1.sec-prxy.com | GlobalSign |
| z.x.app2.sec-prxy.com | GlobalSign |
| *.app.tenant-27.sec-prxy.com | GlobalSign |

It should be noted that one certificate can sign one or more domain names. In the example certificate shown in Table 1, the suffix "sec-prxy.com" may be the addition to the original address (e.g., "*.app1", "z.x.app2", or "*.app.tenant-27"), where "h" is a wildcard character.

According to the disclosed embodiments, when a client device 220 sends a request to access one of the cloud applications 215, one of the proxy devices 230 is configured to receive the request (e.g., a HTTPS request) and to determine if a domain name designated in the received request relates to or designates a signed domain name. A signed domain name is a domain name signed by a certificate locally saved in the proxy device receiving the request. It should be noted that the signed domain name is the modified (suffixed or rewritten) domain name.

For example, a proxy device 230-2 maintaining the certificate CERT-1, and receiving a request with a domain name "z.x.app2.sec-prxy.com" would determine the domain name " " as a signed domain name. In that case, the proxy device 230-2 would return the certificate (e.g., CERT-1) including the signed domain name to the requesting client device (e.g., client device 220-2).

If the requested domain name is not a signed domain name, the proxy device 230 is configured to cause generation of a certificate signing the respective modified domain name. For example, if a request with a domain name "y.t.app3.com" is received at a proxy device 230-1 maintaining only the CERT-1, such a domain name is not a signed domain name and a new certificate is required.

According to an embodiment, each proxy device 230 is configured to generate new certificates, on-demand, using the CGS 240. To this end, any proxy device 230 that requires a valid certificate is configured to query the CGS 240 to provide such a certificate. In an embodiment, the query designates a domain name that needs to be signed by the certificate. In certain embodiments, prior to sending the query, the validity of the domain name to be signed and the destination server is checked. For example, such a check can be performed by sending a ping request, by requesting a public certificate from the destination server, or both. In some embodiments, when the received request includes a modified domain name, the original domain name is identified and it is checked if the modified domain name is valid. For example, a received request with a domain name "z.x.app2.sec-prxy.com" is un-suffixed into "z.x.app2.com", and it is checked if that domain name is valid as compared to the original domain name.

If such a certificate is maintained by the CGS 240, the certificate is returned to the proxy device 230. If not, the proxy device 230 is configured to send the CGS 240 a certification request. A certification request is a message in a standard format that may include the public key for which the certificate should be issued, the domain name, a digital signature, and other identifying information.

The CGS 240 is configured to send the certification request to the CA system 270 to issue a new certificate signing the domain name designated in such request. The CGS 240 is also configured to save the new issued certificate in the certificate database 260 and to forward the issued certificate to the proxy device 230 that initiated the certification request.

In an embodiment, prior to sending a certification request to the CGS 240, a proxy device 230 may query other proxy devices 230 regarding whether they maintain a cached copy of the required certificate. If so, the required certificate may be provided by a peer device of the proxy devices 230, thereby eliminating the need to generate a new certificate.

According to the disclosed embodiments, any newly issued (generated) certificate is distributed to all proxy devices 230 connected to the network 250. To this end, each proxy device 230 is configured to pull new certificates from the CGS 240 at predefined time intervals (e.g., every 1 minute). The CGS 240 may also ping the proxy devices 230 indicating that new certificates are available as well as the signed domain names in such certificates. Each proxy device 230 is configured to send a pulling request to the CGS 240, where such a request may be in a format of a certification request. In another embodiment, the pulling request may be sent through an API.

In alternative embodiment, the CGS 240 is configured to send the issued certificates to the proxy devices 230 every predefined time interval or when a new certificate is issued.

In yet another embodiment, the new certificate is sent to the proxy device 230 (e.g., the proxy device 230-1) that initiated the certification request. Then, the proxy device 230-1 may send the received certificate to one more other proxy devices of the proxy devices 230. The certificate distribution, according to this embodiment, may be realized by propagating the certificates from one proxy device to another. The propagation route between the devices 230 may be determined based on bandwidth, availability, geographical distance, and so on.

It should be noted that updating the proxy devices 230 with newly issued certificates increases the probability that each proxy device 230 would be able to serve a valid certificate upon receiving requests from the client devices 220. Thus, the proposed embodiments would reduce the latency of serving requests from the client devices 220 and improve the overall performance of the cloud applications 215 and the cloud computing platform 210.

In an embodiment, a certification request to the CGS 240 may be a request to update an existing certificate to include the domain name. For example, if the domain name to be signed is "y.tapp3.sec-prxy.com", a proxy device 230 may send a request to update CERT-1 including this domain name. The updated certificate CERT-1.1 is shown in Table 2.

TABLE 2

| CERT 1.1 | |
| --- | --- |
| *.app1.sec-prxy.com | GlobalSign |
| z.x.app2.sec-prxy.com | GlobalSign |
| *.app.tenant-27.sec-prxy.com | GlobalSign |
| y.t.app3.sec-prxy.com | GlobalSign |

Each proxy device 230 receiving the updated certificate (e.g., CERT 1.1) would replace this certificate with an old version of the respective certificate (e.g., CERT 1). It should be noted that having multiple domain names in one certificate would reduce the cache memory required to maintain certificates by each proxy device 230.

In an embodiment, the number of domain names to be included (signed) by one certificate is limited to a predetermined number (e.g., 100 names) to allow fast processing of the certificate by the proxy devices 230 and the client devices 220. In another embodiment, domain names having a common sub-domain belonging to the same cloud applications 215 or service provider are grouped in the same certificate.

As noted above, the newly issued (or generated) certificates are saved in the certificate database 260. In an embodiment, the certificate database 260 may be a cloud service configured to store and manage certificates. An example for such a service cloud is Azure® Key Vault. Typically, such services, other than providing secured storage for certificates, allow users to import, revoke, or re-configure certificates. It should be noted that the certificate database 260 is depicted as directly connected to the CGS 240 for illustration purposes only and without limitation on the disclosed embodiments. The connection may be facilitated over the network 250. In some configurations, the CGS 240 and the certificate database 260 may be integrated and reside in the same system.

In an example deployment, the access to the cloud applications 215 can be secured by the security system 280. The security system 280 may be configured to intercept, monitor, modify, and forward network communications traffic directed from the proxy device 230. For example, the security system 280 can be configured to detect and mitigate network threats against the cloud applications 215, the infrastructure of the cloud computing platform 210, or both. The detection and mitigation activities may include, for example, alerting on suspicious network traffic and behavior; blocking threats; performing application control, URL filtering, and malware protection on the network traffic; establishing visibility to application layer parameters (e.g., a list of users, devices, locations, etc.); generating profiles of users using the cloud applications 215; providing alerts on specific or predefined events; generate audit logs; and so on.

It should be noted that the embodiments disclosed herein are not limited to the specific architecture illustrated in FIG. 2, and that other architectures may be equally used without departing from the scope of the disclosed embodiments. Specifically, in an embodiment, there may be a plurality of cloud computing platforms, a plurality of data centers, or both, managed by the same of different service providers. Furthermore, without departing from the scope of the disclosed embodiments, there may be a plurality of CGSs 240 operating as described hereinabove and configured to either have one as a standby gateway to take control in a case of failure, to share the load between them, or to split the functions between them.

Each of the CGS 240, the CA system 270, and the proxy devices 230 may include a processing circuitry coupled to a memory (not shown in FIG. 2). The processing circuitry may be realized by one or more hardware logic components and circuits. A detailed discussion for implementing a proxy device 230 is provided below.

Figure 3:
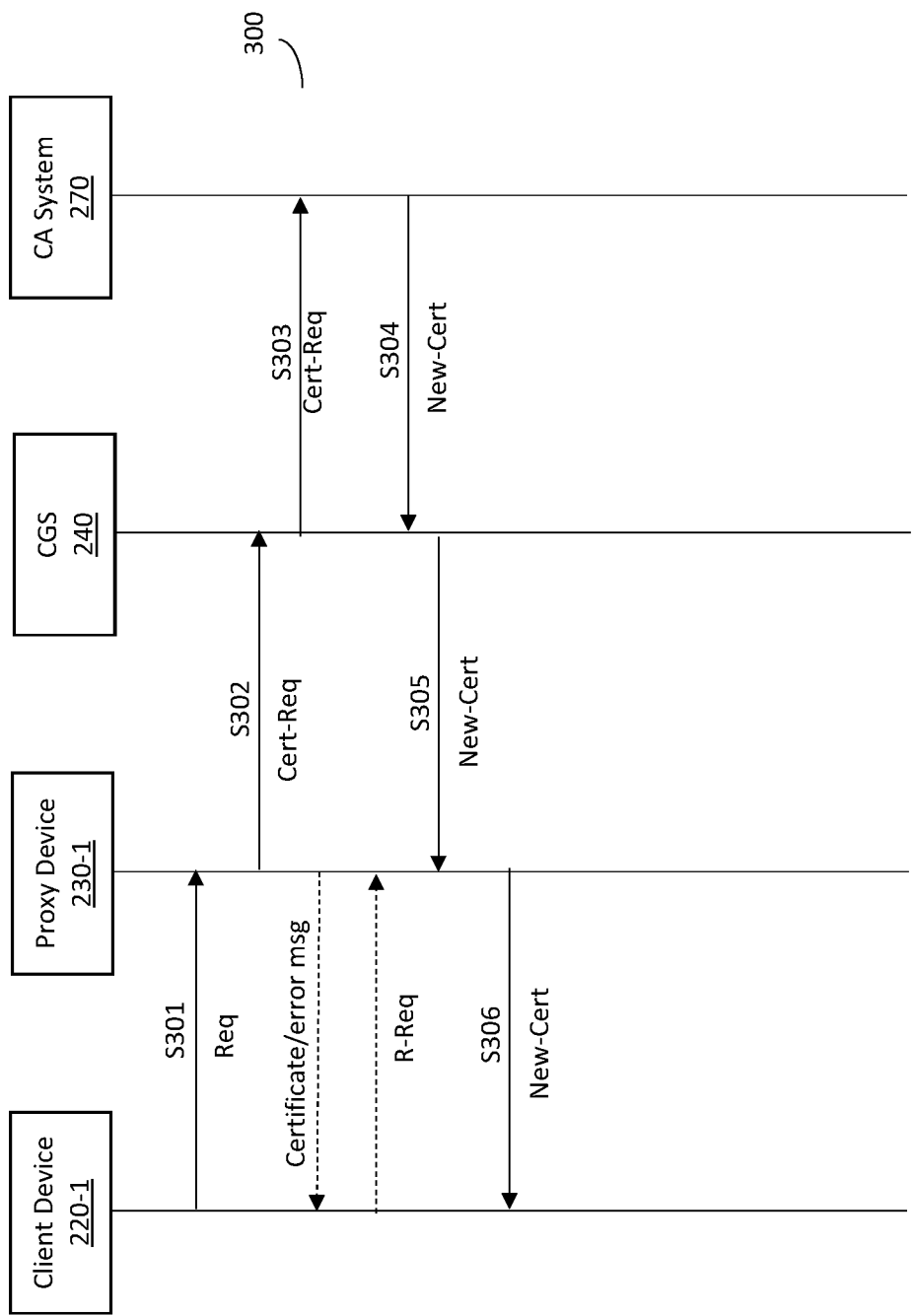
FIG. 3 is a sequence diagram illustrating an on-demand generation of cryptographic certificates according to an embodiment.

FIG. 3 shows an example sequence diagram 300 illustrating an on-demand generation of cryptographic certificates according to an embodiment. The diagram 300 illustrates a client device 220-1, a proxy device 230-1, the CGS 240, and the CA system 270. Some embodiments that can be implemented to realize each of these entities and the connectivity between these entities are discussed in detail above. It should be noted that only one client device and one proxy device are shown in FIG. 3 merely to simplify the discussion.

At S301, a request (Req), e.g., an HTTPS request, sent from the client device 220-1 is received at the proxy device 230-1. The request designates at least a domain name of a cloud application (not shown in FIG. 3) to access. The proxy device 230-1 is configured to analyze the received request to determine if the domain name designated therein is a signed domain name. In an example embodiment, the received domain name may not be a modified domain name, but the proxy device 230-1 may still be configured to check if it maintains a certificate signing the corresponding domain name. For example, if the domain name in the request is "hello.app1.com," it is checked if the suffixed domain name "hello.app1.sec-prxy.com" is a signed domain. Following this example, if the proxy device 230-1 maintains only the certificate, CERT-1 (see Table 1), then the domain name "app1.sec-prxy.com" is a signed domain name. In this case, the certificate CERT-1 is returned to the client device.

In an embodiment, when the proxy device 230-1 determines that the domain name is not a signed domain name, then an error message is sent to the client device 220-1. In addition, at S302, a certification request (Cert-Req) is sent to the CGS 240. In an embodiment, prior to sending the certification request, the proxy device 230-1 queries the CGS 240 as to whether the CGS 240 maintains a valid certificate signing the domain name. It should be noted that, when the client device 220-1 receives an error message, the client device 220-1 sends additional "retry" requests (R-Req). The proxy device 230-1 eventually serves a valid certificate in response to such a retry request.

The certification request is utilized to generate a new certificate. In an embodiment, the certification request includes the following fields: a domain name to be signed; identifying information (organization, email address, location, address, etc.); and the public key of the proxy device 230-1. The certification request may be encoded.

At S303, the CGS 240 sends the received certification request to the CA system 270 to issue (generate) a new certificate based on the information designated in the request. In an embodiment, S303 is performed only if it is required to generate the certificate, i.e., when the requested certificated is not maintained by the CGS 240 or the database 260 (FIG. 2). As noted above, the certification request may include a request to update an existing certificate with a new domain name to be signed.

At S304, the CA system 270 returns the newly issued certificate (New-Cert) to the CGS 240, which forwards the certificate (New-Cert) to the proxy device 230-1 (S305). The CGS 240 may further save the newly issued certificate in the database 260 (FIG. 2). As discussed in detail above, the newly issued certificates are shared with all proxy devices that proxy traffic to the cloud computing platform.

To complete the process for establishing a secured connection with the client device 220-1, at S306, the proxy device 230-1 serves the new issued certificate to the client device 220-1.

Figure 4:
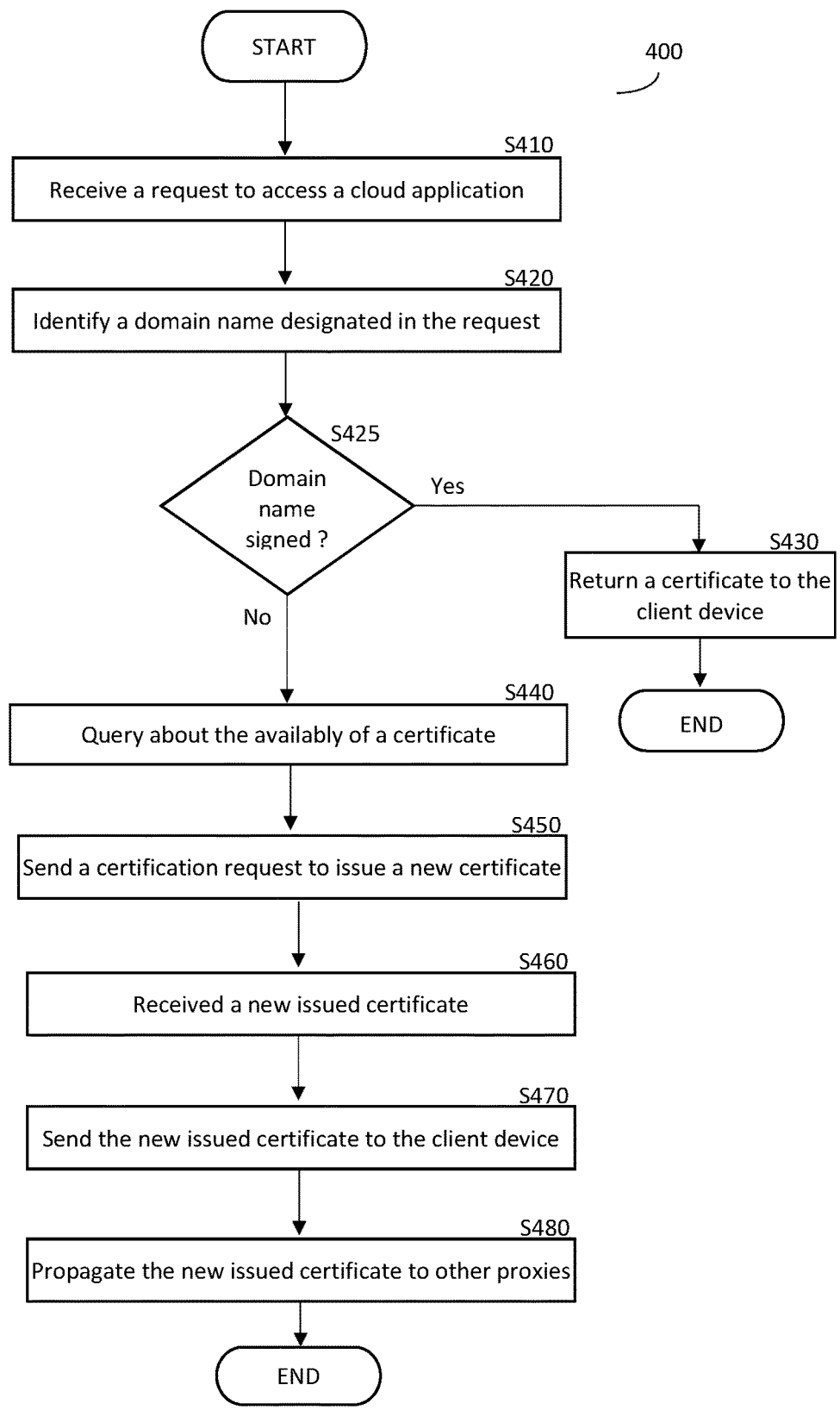
FIG. 4 is a flowchart illustrating a method for on-demand generation of cryptographic certificates according to an embodiment.

FIG. 4 depicts an example flowchart 400 illustrating a method for on-demand generation and distribution of cryptographic certificates according to an embodiment. The method may be performed by each of the proxy devices 230 discussed herein above with reference to FIG. 2.

At S410, a request to access a cloud application over a secured connection or protocol is received from a client device. The request may be an HTTPS request, a SMTPS request, or any other cryptographic protocol.

At S420, the received request is processed to identify a domain name designated therein. At S425, it is determined if the identified domain name is a signed domain name and, if so, execution continues with S430; otherwise, execution continues with S440. The identified domain name may be a modified (suffixed or rewritten) version of an original domain name. A few examples are provided above. A signed domain name is a domain name being signed by a certificate locally maintained by the proxy device. At S430, a certificate that signed the identified signed domain name is returned to the client device and execution terminates.

At S440, a query is sent to a CGS (e.g., the CGS 240), the proxy devices, or both. Such a query is utilized to query for the availability of a valid certificate signing the identified domain name. In an embodiment, such a query may be communicated to the CGS, the proxy devices, or both, through an API. In certain embodiments, prior to sending the query, the validity of the original domain name (e.g., un-suffixed version) and/or the destination server is checked. For example, such a check can be performed by sending a ping request, by requesting a public certificate from the destination server (e.g., server 217, FIG. 2), or both.

At S450, if the certificate was not received, a certification request to issue a new certificate is sent to the CGS. The certification request includes at least the domain name to be signed and the public key of the proxy device.

At S460, the newly issued certificate is received from the CGS. At S470, the newly issued certificate is served to the client device. In an embodiment, the newly issued certificate is served in response to a retry or new request received from the client device. At optional S480, the received newly issued certificate is propagated to all other proxy devices communicatively connected to other proxy devices. Alternatively or collectively, a pulling request is sent to the CGS to retrieve all certificates that have been recently issued. In such case, the pulling requests are frequently sent to the CGS.

It should be appreciated that utilizing the CGS as a centralized source for the on-demand generation of certificates ensures that multiple requests, for different proxy devices, to generate the same certificate may be received from the CA. It should be also appreciated that distributing newly issued certificates among proxy devices 230 would increase the probability that certificates can be immediately served to client devices, thereby reducing the latency involve with establishing new secured connections.

Figure 5:
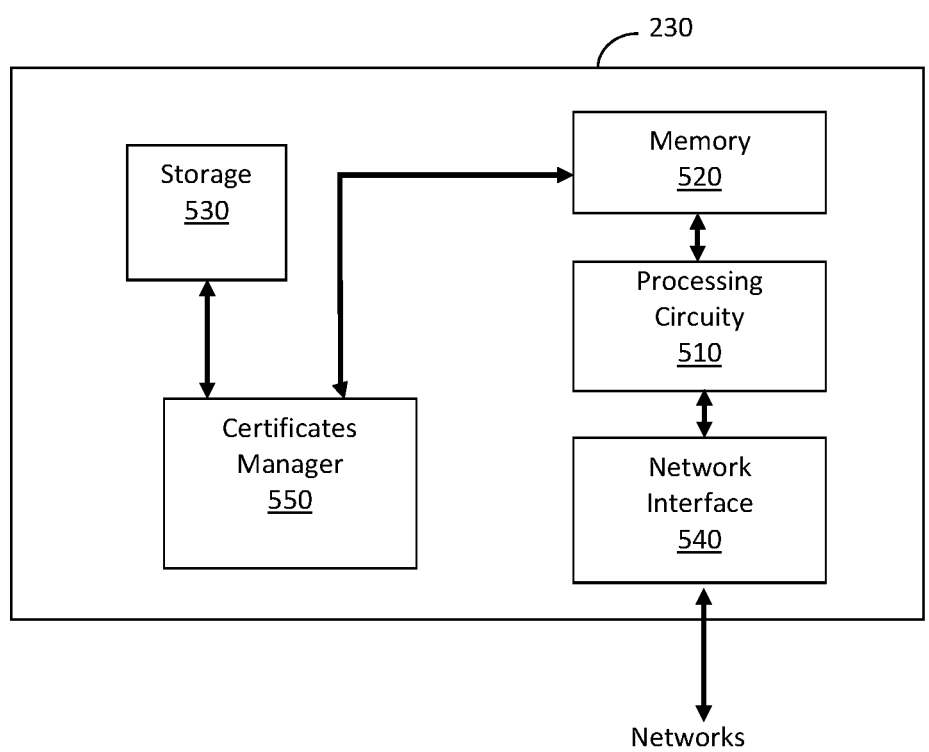
FIG. 5 is a block diagram of a proxy device implemented according to an embodiment.

FIG. 5 shows an example block diagram of a proxy device 230 constructed according to an embodiment. The proxy device 230 may be deployed in cloud computing platforms, data centers, or as a stand-alone network device. The proxy device 230 may be either a forward proxy or a suffix proxy and is configured to handle cryptographic protocols.

The proxy device 230 is configured to at least perform on-demand generation and distribution of certificates. The proxy device 230 includes a processing circuitry 510 coupled to a memory 520, a storage 530, a network interface 540, and a certificates manager 550.

The processing circuitry 510 may be realized by one or more hardware logic components and circuits. For example, and without limitation, illustrative types of hardware logic components that can be used include Field Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory 520 may be volatile (e.g., RAM, etc.), non-volatile (e.g., ROM, flash memory, etc.), or a combination thereof.

The storage 530 may be magnetic storage, optical storage, and the like, and may be realized, for example, as flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information.

In one configuration, computer readable instructions to implement one or more embodiments disclosed herein may be stored in the storage 530. The storage 530 may also store other computer readable instructions to implement an operating system, an application program, and the like. Computer readable instructions may be loaded in the memory 520 for execution by the processing circuitry 510.

In some configurations, a portion of the storage device 530 may be realized as a cache memory configured to store, for example, certificates of signed domain names. The certificates may be pre-installed or pre-loaded to the storage 530, and may be added in response to requests to generate certificates or to retrieve certificates from the CGS. The storage device 530 may also include public keys, session keys, and the like required to perform an authentication process.

In another embodiment, the storage 530, the memory 515, or both are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 510 to perform the various functions described herein. Such functions may include, but are not limited to, controlling the operation of the certificates manager 550 and other tasks conventionally performed by the forward or suffix proxy (e.g., rewriting or suffixing URLs).

The network interface 540 allows the proxy device 230 to communicate with other proxy devices, the CGS, and client devices. The communication may be over a network (e.g., the network 250, FIG. 2) using standard cryptographic communication protocols, proprietary APIs, or both.

In an example embodiment, the network interface 540 allows for remote access to the proxy devices 230 for the purpose of, for example, configuration, reporting, and the like. Such a connection, in an embodiment, can be realized through a web portal. The network interface 540 may include a wired connection or a wireless connection. The network interface 540 may transmit communication media, receive communication media, or both. For example, the network interface 540 may include a modem, a network interface card (NIC), an integrated network interface, a radio frequency transmitter/receiver, an infrared port, a USB connection, and the like.

The certificates manager 550 is configured to perform the process for on-demand generation of certificates. Upon receiving a request from a client, the certificates manager 550 is configured to check if a valid certificate that can be served is saved in the storage 530. If not, the certificates manager 550 is configured to initiate a process for generating certificate for signing a domain name that is current not signed by a certificate saved in the storage 530. This process is discussed in more detail above. The certificates manager 550 is further configured to frequently retrieve certificates from the CGS.

In an embodiment, the certificates manager 550 can be realized by one or more hardware logic components and circuits. For example, and without limitation, illustrative types of hardware logic components that can be used include FPGAs, ASICs, ASSPs, SOCs, CPLDs, general-purpose microprocessors, DSPs, and the like, or any other hardware logic components that can perform calculations or other manipulations of information.

The various embodiments disclosed herein can be implemented as hardware, firmware, software, or any combination thereof. Moreover, the software is preferably implemented as an application program tangibly embodied on a program storage unit or non-transitory computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for on-demand generation of cryptographic certificates, comprising:
   receiving, by a proxy device, a request to access a cloud application;
   identifying a domain name designated in the received request;
   determining when the identified domain name is signed by a valid cryptographic certificate saved locally in the proxy device;
   querying at least one of a certificate generator system and a plurality of proxy devices regarding availability of a cryptographic certificate signing the un-signed domain name, wherein the certificate generator system is the centralized system serving the plurality of proxy devices; and sending, to the certificate generator system, a certification request to issue a new cryptographic certificate to sign the identified domain name, when the identified domain name is not a signed domain name.

2. The method of claim 1, further comprising:
receiving the newly issued cryptographic certificate from the certificate generator system; and
serving the newly issued cryptographic certificate to a client device requesting to access the cloud application.

3. The method of claim 1, further comprising;
frequently pulling, from the certificate generator system, newly issued cryptographic certificates.

4. The method of claim 1, further comprising:
propagating the newly issued cryptographic certificate to the plurality of proxy devices through the proxy device using the newly issued cryptographic certificate.

5. The method of claim 1, further comprising:
serving a valid cryptographic certificate locally saved in the proxy device, when the identified domain name is a signed domain name.

6. The method of claim 1, wherein the proxy device is any of: a forward proxy and a suffix proxy.

7. The method of claim 1, wherein the certification request is a request to update a valid cryptographic certificate locally saved in the proxy device with the identified domain name.

8. The method of claim 1, wherein the identified domain name is a modified domain name of an original domain name designating the cloud application.

9. A non-transitory computer readable medium having stored thereon instructions for causing a processing circuitry to execute a process for on-demand generation of cryptographic certificates, the process comprising:
receiving, by a proxy device, a request to access a cloud application;
identifying a domain name designated in the received request;
determining when the identified domain name is signed by a valid cryptographic certificate saved locally in the proxy device;
querying at least one of a certificate generator system and a plurality of proxy devices regarding availability of a cryptographic certificate signing the un-signed domain name, wherein the certificate generator system is the centralized system serving the plurality of proxy devices; and
sending, to the certificate generator system, a certification request to issue a new cryptographic certificate to sign the identified domain name, when the identified domain name is not a signed domain name.

10. A proxy device for on-demand generation of cryptographic certificates, comprising:
a processing circuitry; and
a memory, the memory containing instructions that, when executed by the processing circuitry, configure the proxy device to:
receive, by a proxy device, a request to access a cloud application;
identify a domain name designated in the received request;
determine when the identified domain name is signed by a valid cryptographic certificate saved locally in the proxy device;
query at least one of a certificate generator system and a plurality of proxy devices regarding availability of a cryptographic certificate signing the un-signed domain name, wherein the certificate generator system is the centralized system serving the plurality of proxy devices; and
send, the a certificate generator system, a certification request to issue a new cryptographic certificate to sign the identified domain name, when the identified domain name is not a signed domain name.

11. The proxy device of claim 10, wherein the proxy device is further configured to:
receive the newly issued cryptographic certificate from the certificate generator system; and
serve the newly issued cryptographic certificate to a client device requesting to access the cloud application.

12. The proxy device of claim 10, wherein the proxy device is further configured to:
frequently pull, from the certificate generator system, newly issued cryptographic certificates.

13. The proxy device of claim 10, wherein the proxy device is further configured to:
propagate the newly issued cryptographic certificate to the plurality of proxy devices through the proxy device using the newly issued cryptographic certificate.

14. The proxy device of claim 10, wherein the proxy device is further configured to:
serve a valid cryptographic certificate locally saved in the proxy device, when the identified domain name is a signed domain name.

15. The proxy device of claim 10, wherein the proxy device is any of: a forward proxy and a suffix proxy.

16. The proxy device of claim 10, wherein the certification request is a request to update a valid cryptographic certificate locally saved in the proxy device with the identified domain name.

17. The proxy device of claim 10, wherein the identified domain name is a modified domain name of an original domain name designating the cloud application.

* * * * *